Patented July 2, 1935

2,006,734

UNITED STATES PATENT OFFICE 2,006,734

PRODUCTION OF ESTERIFIED OLEFINES

Karl R. Edlund and Theodore Evans, Berkeley, Calif., assignors to Shell Development Company, San Francisco, Calif., a corporation of Delaware No Drawing. Application September 2, 1933, Serial No. 688,062

21 Claims. (Cl. 260—106)

This invention relates to the preparation of organic acid esters and more particularly it relates to the production of esters from olefines without diluting the reaction mixture to recover ester material and further contemplates a process wherein the esterifying agent and catalyst is contained in an acidic body which is maintained substantially constant in composition and volume during the continuous or intermittent execution of the reaction.

In practicing our process, we may proceed substantially as follows. Olefinic material, preferably in the liquid phase, is introduced into a reaction unit where it is brought into intimate contact with an organic acid and catalyst by agitation for example or by other dispersing means. When the olefinic material is substantially pure, the unreacted portion is capable of functioning as a carrier or solvent for part of the ester formed and advantage is taken of this fact in the following manner: the reaction mixture is permitted to stratify into two liquid phases. Stratification may take place in the reaction unit which may be equipped with suitable heating and/or cooling means, or may occur outside of the reaction unit in a separator. The unreacted olefinic material is present in, what we call, the solvent phase with a substantial proportion of the formed ester. This phase is separately subjected to a treatment for the recovery of ester therefrom. The other or acid phase may be reused for the preparation of further batches of ester.

In executing an intermittent process, the acid phase, resulting from stratification of the reaction mixture, may be charged into another reaction unit and the reaction effected therein with raw materials. Subsequently, stratification is effected and the resulting acid phase charged into the first reaction unit or into a third reaction unit while the first reaction unit is having added thereto the reactants and condensing catalyst.

To carry out the reaction continuously, olefinic materials, organic acid and condensing catalyst are charged into a reaction unit and brought into intimate contact therein. After the reaction has been effected, the material is discharged into a separator wherein it stratifies into two liquid phases. The acid phase is returned to the reaction unit while at least part of the solvent phase is drawn off for the recovery of ester therefrom. A hydrostatic balance is maintained on the system so that olefinic material and organic acid are automatically fed into the reaction unit at a rate sufficient to compensate for the withdrawal of olefinic material organic acid, in the free and combined state, from the system. From time to time, replacement is had of the catalytic material removed with the solvent phase, if any is carried off therewith.

The invention may be practiced with olefines as: ethylene, propylene, butene-1, butene-2, secondary amylenes, secondary hexylenes, and the like as well as with mixtures of two or more of the same. Our process is not restricted to the use of substantially pure olefinic material, as it may be executed with olefinic mixtures containing organic compounds capable of functioning in the same manner as unreacted olefinic material, i. e. acting as carriers or solvents for part of the ester formed. We have found mixtures of paraffin and olefine hydrocarbons especially suitable. The paraffin hydrocarbons are unattacked under the conditions of reaction and, with unreacted olefines, constitute the solvent phase after stratification of the reaction mixture.

The olefines to be treated may be obtained from any suitable source, for instance, from natural gas, as by condensation and/or cracking, or from gases or products which are formed in distilling or cracking petroleum or petroleum products, or may be derived from coal, oil shales and like carboniferous natural materials. Also, the olefines may be obtained from the products which are formed by the destructive hydrogenation of carbonaceous materials such as coal, brown coal, tar, coal tar, petroleum and petroleum products, and other carbonaceous materials which are suitable for treatment by destructive hydrogenation.

The olefinic mixtures obtained from the materials heretofore mentioned are exceedingly complex and it is, therefore, desirable when substantially pure esters are desired, to subject these mixtures to fractionation by condensation and/or distillation whereby paraffin and olefine hydrocarbons containing the same number of carbon atoms to the molecule predominantly comprise the fraction. Accordingly, hydrocarbon fractions such as a butene-butylene fraction, a pentane-amylene fraction, a hexane-hexylene fraction and the like as well as fractions consisting predominantly, for example, of hydrocarbons containing four and five carbon atoms to the molecule may be used.

Higher conversions are obtained when the tertiary olefines and diolefines are selectively removed from the olefine stock before use. Removal may be effected via polymerization, sulfation, chlorination, hydrochlorination, etherification, solvents, etc.

The organic acids may comprise acetic, propionic, butyric, isobutyric acids and the like, as well as benzoic, succinic, α-chlor propionic acid, etc. Where mixtures of different esters are desired, two or more organic acids may be employed. In certain cases, ester material may be introduced with the organic acid to shorten the initial reaction period for the raw material.

Various catalytic material may be employed and may comprise metal salts commonly employed as esterification catalysts as zinc chloride, for example, or, preferably comprise an acidic agent as sulfuric acid, the sulfonic acids of benzene and its homologues, acid sulfates of hydrocarbons such as ethyl, propl, butyl, amyl hydrogen sulfates, sulfoacetic acid, chlorsulfonic acids, etc.

Under normal circumstances, the solvent phase is the upper phase which consists predominantly of solvent and ester, with controlled amounts of catalyst (when of acid character) and esterifying agent. The lower or acid phase is a complex mixture consisting nominally of esterifying agent, catalyst and ester; actually there also are present acid esters and complexes. For example, when acetic acid is employed with sulfuric acid as catalyst, there are also present in the acid phase, after introduction of olefinic material, alkyl hydrogen sulfates, some sulfoacetic acid, and other complexes of unknown constitution.

In an intermittent or continuous operation, the acid phase is maintained substantially constant in composition and volume, once the process is initiated. For all practical purposes, the acid phase can be considered as part of the reaction unit due to its substantially unvarying character and hence may be utilized to effect the esterification of theoretically infinite quantities of olefines with infinite quantities of organic acid.

The volume of the lower phase is preferably made a large fraction of the reaction unit volume, as it was found that the rate of reaction increases with the ratio of the volume of lower phase to upper. Since the acid phase may be looked upon as part of the apparatus, one is only concerned with working up the removed portion of the upper phase which may be done as follows: the removed portion is, preferably, first water-washed to remove free acids. The material is then preferably steam distilled in the presence of an insoluble alkali, such as calcium carbonate, to neutralize any acid formed. A separation is effected at this stage of esters and polymer from solvent material and the ester recovered by distillation.

By controlling the acid catalyst-organic acid ratio in the lower phase, the acidity of the solvent phase is controlled. The greater this ratio, the lower the free organic acid content of the solvent phase. At the same time, reduction of the organic acid concentration implies a reduction in its activity, and generally there will be less ester formed. Consequently there are two factors involved which must be balanced:

(1) The lower the organic acid content of the solvent phase, the less organic acid there is to recover or lose.

(2) The higher the organic acid content of the solvent phase, the greater the ester yield.

When the organic acid content builds up in the solvent phase, it means too much of the former is present in the acid phase, hence more acid catalyst should be added to the acid phase to dilute the organic acid and hence decrease its activity.

A criterion of efficiency is the ratio ester: free organic acid in the solvent phase. As this ratio decreases, the proportion of organic acid which must be recovered rises. Hence it is desirable to have this ratio as high as practicable.

In case it is desired to recover organic acid from water-washings, the latter may be extracted with ingoing fresh hydrocarbon material, for example.

The invention can be practiced at atmospheric, superatmospheric or subatmospheric pressure. At superatmospheric pressure, the rate of reaction is favored. The process is conducted at moderately elevated temperatures, the exact temperature depending on the character of the olefinic material, organic acid and reaction product.

The presence of water appears to be unfavorable to the direct addition of olefines to organic acids, and for this reason the organic acid used should be in the substantially anhydrous state.

The following examples are presented to illustrate specific embodiments of the invention only.

*Example I*

106 gm. acetic acid, 109 gm. sulfuric acid, and 419 gm. of an amylene-pentane fraction (containing 2% tertiary amylenes, 33% secondary amylenes, and 65% pentane) are stirred for two hours at 60° C., and then cooled to room temperature. There are two phases, which are separated. The upper phase analyzes as follows:

| | Per cent |
|---|---|
| Amylene | 9.9 |
| Pentane | 60.6 |
| Amyl acetate | 18.3 |
| Polymer | 3.6 |
| Acetic acid | 3.0 |
| Sulfuric acid | 0.9 |
| Sulfur dioxide | 0.03 |
| Diamyl sulfate } Amyl acid sulfate } Unknown } | 3.67 |

This upper phase is worked up to recover its ester content, for example, by steam distillation.

The lower phase shows the following approximate figures for its chief constituents:

| | Per cent |
|---|---|
| Amyl acetate | 24.3 |
| Acetic acid | 21.5 |
| Sulfuric acid | 31.9 |

This lower phase is not worked up for its ester content, but is used as the "catalyst" for treating a fresh batch of amylene-pentane and acetic acid. The amylene-pentane and acetic acid are taken in such proportions that the resulting upper phase contains just as much acetic acid, free and combined, as was added to the amylene-pentane initially. In this way, the composition of the lower phase is maintained substantially constant, except for slight losses of sulfuric acid which are made up occasionally. In this way, the initial lower phase becomes the "catalytic mass" by which theoretically an infinite amount of olefine can be subsequently acetylated.

With amyl acetate manufacture, it is preferable to maintain a free acid concentration in the solvent phase not to exceed 10%.

*Example II*

Employing a hydrocarbon mixture containing propylene at 85° C., the upper phase showed the following analysis:

|  | Per cent |
|---|---|
| Isopropyl acetate | 12.2 |
| Acetic acid | 1.4 |
| Sulfuric acid | 0.7 |
| Hydrocarbons other than propylene | 79.0 |
| Propylene | 6.7 |

*Example III*

A pentane-amylene fraction containing 7.6% tertiary amylenes, 76.5% secondary amylenes and the rest pentane was used. The initial lower phase was made up of sulfuric acid, acetic acid and amyl acetate in proportions estimated to be in equilibrium with the upper phase to be obtained. The composition of the equilibrium upper phase was:

|  | Per cent |
|---|---|
| Amyl acetate | 44.5 |
| Acetic acid | 3.9 |
| Amylene | 32.7 |
| Sulfuric acid | 0.4 |
| Polymer | 5.0 |
| Pentane | 10.9 |
| Undetermined errors | 2.6 |

(including about 0.25% diamyl sulfate)

*Example IV*

An amylene-pentane fraction analyzing 2% tertiary amylenes and 33% secondary amylenes was reacted for one and one-half hours at 60° C. with a mixture of 70 gms. acetic acid and 18 gms. sulfuric acid in the presence of a lower phase of a previous run whose composition is similar to that given in Example I. The mixture was then cooled to room temperature. The upper phase analyzed (independently of hydrocarbons present) 23.1% amyl acetate, 4.8% acetic acid, 0.9% sulfuric acid and 2.5% polymer. The percentage conversion of secondary amylenes to amyl acetate was 44% while 67.5% of the added acetic acid was converted to amyl acetate.

While we have in the foregoing described in some detail the preferred embodiment of our invention and some variants thereof, it will be understood that this is only for the purpose of making the invention more clear and that the invention is not to be regarded as limited to the details of operation described, nor is it dependent upon the soundness or accuracy of the theories which have advanced as to the reasons for the advantageous results attained. On the other hand, the invention is to be regarded as limited only by the terms of the accompanying claims, in which it is our intention to claim all novelty inherent therein as broadly as is possible in view of the prior art.

We claim as our invention:

1. The process of producing esters which comprises, heating an organic carboxylic acid with an olefine in the presence of a condensing catalyst, stratifying the reaction mixture into a solvent phase containing ester and an acid phase without dilution of the reaction mixture, and recovering ester from the solvent phase.

2. The process of producing esters which comprises, heating an organic carboxylic acid with an olefine in the presence of sulfuric acid, stratifying the reaction mixture into a solvent phase containing ester and an acid phase without dilution of the reaction mixture, and recovering ester from the solvent phase.

3. The process of producing esters which comprises, heating a fatty acid with an olefine in the presence of a condensing catalyst, stratifying the reaction mixture into a solvent phase containing ester and an acid phase without dilution of the reaction mixture, and recovering ester from the solvent phase.

4. The process of producing esters which comprises, heating an organic carboxylic acid with a hydrocarbon mixture containing paraffin and olefine hydrocarbons in the presence of a condensing catalyst, stratifying the reaction mixture into a solvent phase containing ester and an acid phase without dilution of the reaction mixture, and recovering ester from the solvent phase.

5. The process of producing esters which comprises, heating an organic carboxylic acid with a hydrocarbon mixture containing paraffin and olefine hydrocarbons but substantially devoid of tertiary olefines in the presence of a condensing catalyst, stratifying the reaction mixture into a solvent phase containing ester and an acid phase without dilution of the reaction mixture, and recovering ester from the solvent phase.

6. The process of producing esters which comprises, heating an organic carboxylic acid with a hydrocarbon fraction consisting predominantly of olefine and paraffin hydrocarbons containing the same number of carbon atoms to the molecule in the presence of a condensing catalyst, stratifying the reaction mixture into a solvent phase containing ester and an acid phase without dilution of the reaction mixture, and recovering ester from the solvent phase.

7. The process of producing esters which comprises, heating an organic carboxylic acid with a butane-butene fraction in the presence of a condensing catalyst, stratifying the reaction mixture into a solvent phase containing ester and an acid phase without dilution of the reaction mixture and recovering ester from the solvent phase.

8. The process of producing esters which comprises, heating an organic carboxylic acid with a pentane-amylene fraction in the presence of a condensing catalyst, stratifying the reaction mixture into a solvent phase containing ester and an acid phase without dilution of the reaction mixture and recovering ester from the solvent phase.

9. The process of producing esters which comprises, heating an organic carboxylic acid with an olefine in the presence of a condensing catalyst, stratifying the reaction mixture into a solvent phase containing ester and an acid phase without dilution of the reaction mixture, recovering ester from the solvent phase and introducing the acid phase into a reaction unit wherein an organic carboxylic acid is reacted with an olefine.

10. The process of producing esters which comprises, heating an organic carboxylic acid with an olefine in the presence of a condensing catalyst, removing and stratifying the reaction mixture into a solvent phase containing ester and an acid phase without dilution of the reaction mixture, recovering ester from the solvent phase and returning the acid phase to the reaction unit which originally contained the reaction mixture to react with further organic carboxylic acid and olefine.

11. The process of producing esters which comprises, heating an organic carboxylic acid with an olefine in the presence of a condensing catalyst, removing and stratifying the reaction mixture into a solvent phase containing ester and an acid phase without dilution of the reaction mixture, recovering ester from the solvent phase and returning the acid phase to the reaction unit which originally contained the reaction mixture to react with further organic carboxylic acid and olefine while maintaining the composition and volume of said acid phase substantially constant.

12. The process of producing esters which comprises, heating an organic carboxylic acid with an olefine in the presence of sulfuric acid, removing and stratifying the reaction mixture into a solvent phase containing ester and an acid phase without dilution of the reaction mixture, recovering ester from the solvent phase and returning the acid phase to the reaction unit which originally contained the reaction mixture to react with further organic carboxylic acid and olefine while maintaining the composition and volume of said acid phase substantially constant.

13. The process of producing esters which comprises, heating an organic carboxylic acid with a hydrocarbon mixture containing olefine and paraffin hydrocarbons in the presence of sulfuric acid, removing and stratifying the reaction mixture into a solvent phase containing ester and an acid phase without dilution of the reaction mixture, recovering ester from the solvent phase and returning the acid phase to the reaction unit which originally contained the reaction mixture to react with further organic carboxylic acid and olefine while maintaining the composition and volume of said acid phase substantially constant.

14. The process of producing esters which comprises, heating a fatty acid with an olefine in the presence of sulfuric acid, stratifying the reaction mixture into a solvent phase containing ester and an acid phase without dilution of the reaction mixture, and reusing the acid phase to carry out a reaction therein between said acid and said olefinic material while maintaining its volume and composition substantially constant.

15. The process of producing esters which comprises, heating acetic acid with an olefine in the presence of sulfuric acid, stratifying the reaction mixture into a solvent phase containing ester and an acid phase without dilution of the reaction mixture, and reusing the acid phase to carry out a reaction therein between said acid and said olefinic material while maintaining its volume and composition substantially constant.

16. The process of producing esters which comprises, heating acetic acid with a hydrocarbon mixture of olefine and paraffin hydrocarbons in the presence of sulfuric acid, stratifying the reaction mixture into a solvent phase containing ester and an acid phase without dilution of the reaction mixture, and reusing the acid phase to carry out a reaction therein between said acid and said olefinic material while maintaining its volume and composition substantially constant.

17. The process of producing esters which comprises, heating acetic acid with an olefine in the presence of sulfuric acid, stratifying the reaction mixture into a solvent phase containing ester and an acid phase without dilution of the reaction mixture, and recovering ester from the solvent phase.

18. The continuous process of producing esters which comprises, heating a liquid aliphatic monocarboxylic acid with an olefine in the presence of sulfuric acid in a reaction unit, continuously stratifying the reaction mixture into a solvent phase containing ester and an acid phase without dilution of the reaction mixture, and continuously withdrawing at least part of the solvent phase while maintaining the volume and composition of the acid phase substantially constant.

19. The continuous process of producing esters which comprises, heating a liquid aliphatic monocarboxylic acid with a hydrocarbon mixture of olefine and paraffin hydrocarbons in the presence of sulfuric acid in a reaction unit, continuously stratifying the reaction mixture into a solvent phase containing ester and an acid phase without dilution of the reaction mixture, and continuously withdrawing at least part of the solvent phase while maintaining the volume and composition of the acid phase substantially constant.

20. The continuous process of producing esters which comprises, heating a liquid aliphatic monocarboxylic acid with a hydrocarbon fraction consisting predominantly of olefine and paraffin hydrocarbons containing the same number of carbon atoms to the molecule in the presence of sulfuric acid in a reaction unit, continuously stratifying the reaction mixture into a solvent phase containing ester and an acid phase without dilution of the reaction mixture, and continuously withdrawing at least part of the solvent phase while maintaining the volume and composition of the acid phase substantially constant.

21. The process of producing an alkyl ester which comprises reacting an olefine with an organic carboxylic acid in the presence of an acidic condensing catalyst, stratifying the reaction mixture into a solvent phase containing ester and an acid phase without dilution of the reaction mixture, and recovering ester from the solvent phase.

KARL R. EDLUND.
THEODORE EVANS.